United States Patent
Dakan, Sr. et al.

(10) Patent No.: US 6,837,297 B1
(45) Date of Patent: Jan. 4, 2005

(54) METHOD FOR FABRICATING BOTTLE MOLDS

(75) Inventors: Joseph D. Dakan, Sr., Elkins, WV (US); Max L. Elza, Elkins, WV (US)

(73) Assignee: Kelly Foundry & Machine Co., Inc., Elkins, WV (US)

( * ) Notice: Subject to any disclaimer, the term of this patent is extended or adjusted under 35 U.S.C. 154(b) by 0 days.

(21) Appl. No.: 10/813,186

(22) Filed: Mar. 29, 2004

Related U.S. Application Data

(62) Division of application No. 09/788,746, filed on Feb. 20, 2001.
(60) Provisional application No. 60/216,000, filed on Jul. 5, 2000.

(51) Int. Cl.[7] ............................................. B22D 19/00
(52) U.S. Cl. .......................... 164/98; 164/100; 164/111
(58) Field of Search ............................ 164/98, 100, 111, 164/359

(56) References Cited

U.S. PATENT DOCUMENTS 4,154,289 A * 5/1979 Jeanneret ................... 164/358
4,555,259 A * 11/1985 Williamson ................ 65/374.12
4,732,602 A * 3/1988 Dakan et al. ............... 65/374.12

* cited by examiner

Primary Examiner—Kiley S. Stoner
Assistant Examiner—I.-H. Lin
(74) Attorney, Agent, or Firm—Michael J. Weins

(57) ABSTRACT

The method allows fabricating a bottle mold having dissimilar metal inserts embedded in regions where the bottle mold is most subject to attack by hot glass, and has a glass contact surface with refined grain size. To fabricate the bottle mold, rough castings are made by pouring cast-iron into a composite mold having dissimilar metal insert blanks fixably positioned therein. The dissimilar metal insert blanks become embedded in the cast-iron matrix to form rough dissimilar metal inserts in the rough casting. The composite mold has regions formed by metal chills that are partially embedded in a sand mix. The chills and the exposed surfaces of the rough dissimilar metal inserts define a cavity surface of the rough casting, which is subsequently machined to provide the glass contact surface of the bottle mold. The chills refine the grain size of the cast iron at the glass contact surface.

7 Claims, 5 Drawing Sheets

METHOD FOR FABRICATING BOTTLE MOLDS

This application is a division of U.S. application Ser. No. 09/788,746, filed Feb. 20, 2001, which claims benefit of Provisional Appl. 60/216,000, filed Jul. 5, 2000.

FIELD OF THE INVENTION

The present invention relates to molds for the fabrication of glass bottles and a method of making such molds. More particularly, the invention relates to metal bottle molds which have an extended mold life resulting from the combination of a refined grain structure in the region of the mold which terminates in the glass-engaging surface and from the incorporation of metal inserts of a different composition which form part of the glass-engaging surface, as well as a method of making such improved bottle molds.

BACKGROUND OF THE INVENTION

Glass bottles have classically been fabricated by employing metal bottle molds in which the glass bottles are formed. The glass bottles are formed in a two stage process. In the first stage, a "gob" of glass is placed into a blank bottle mold and blown into a crude glass shape having a central cavity. The crude glass shape is then transferred to a final blow bottle mold, in which the crude glass shape is blown to its final shape. The technique for blowing glass into such molds is further discussed in an article entitled Auckland Bottle Works—New Zealand, available on the Internet at the URL "http://www.glass.co.nz/NZglassbottles.htm". The metal bottle molds employed in both of these stages for forming glass bottles are frequently fabricated from cast iron, having a glass contact surface for defining the shape of the glass. While these cast iron bottle molds can, for the most part, withstand the thermal and mechanical stresses which result from the hot glass contacting and flowing over the glass contact surface, there are regions of the bottle molds where the hot glass preferentially degrades the cast iron. This problem is of particular concern with the blank bottle molds, where the temperature of the glass is higher.

The problem of degradation of these regions of the metal bottle molds has, in part, been overcome by providing depressions in these regions, the depressions then being filled with a more durable metal such as a nickel alloy. The depressions can be filled by depositing weld metal into the depressions and thereafter machining the molds to their final contours. Shortcomings of this technique are that it is both time consuming and expensive, as is pointed out in the background of U.S. Pat. No. 4,555,259. The '259 patent teaches a method for fabricating such molds which eliminates some of the problems associated with the welding technique, by casting durable metal inserts into the metal molds. However, to practice the method taught in the '259 patent, both the size of the inserts and the gating system employed to introduce the molten metal into the casting mold must be carefully controlled. Thus, there is a need for a metal bottle mold which can be more easily fabricated and where there is greater freedom in both the size of the inserts which can be incorporated in the mold and the gating system employed to fill the casting mold in which the metal bottle molds are cast.

SUMMARY OF THE INVENTION

The present invention provides an improved method for fabrication of cast-iron bottle molds, as well a cast-iron bottle mold with enhanced mold life. The improved bottle mold fabricated by the method of the present invention has one or more dissimilar metal inserts, preferably of a nickel base alloy, which are embedded in the bottle mold in one or more regions where the bottle mold is most subject to attack by the hot glass. This method for fabricating bottle molds and the bottle molds resulting from the use of this method of fabrication have utility for both blank bottle molds and final blow bottle molds. The resulting glass bottle molds in both cases have features which enhance the mold life. Since the severity of the problem of degradation of the mold is greater for the blank bottle molds, the method of fabrication is hereinafter discussed in terms of fabricating a blank bottle mold; however, the same method is applicable to final blow bottle molds.

In a blank bottle mold, the regions where degradation of the bottle mold is most severe are generally the neck region and the baffle region of the bottle mold. To minimize this problem in a cast iron bottle mold, the bottle mold has dissimilar metal inserts, preferably of a nickel based alloy, embedded in the cast iron in the regions where the degradation is greatest. The bottle mold is fabricated by pouring molten cast-iron into a composite mold to form a cast-iron rough casting. The rough casting has rough dissimilar metal inserts embedded therein. The rough casting is then machined to form the bottle mold, having the appropriate glass contact surface. The rough dissimilar metal inserts are machined to form the dissimilar metal inserts of the finished bottle mold. After machining, the dissimilar metal inserts form an integral part of the glass contact surface of the blank bottle mold. While dissimilar metal inserts have previously been incorporated into: cast-iron bottle molds by embedding them in rough castings, the method of the present invention provides greater flexibility in the size of the dissimilar metal inserts which can be effectively embedded in the rough casting, as well as allowing greater freedom in the gating employed for the rough casting.

The method of fabrication of the bottle mold of the present invention, in addition to simplifying fabrication of the bottle mold, provides structural improvements which, in part, result from a refined grain structure at the glass contact surface of the bottle mold and for a substantial depth therebelow. The bottle molds fabricated by the method of the present invention have a grain size in the region of the bottle mold at and near the glass contact surface of about ASTM size 5–8, while a grain size of ASTM size 2–3 prevails at a substantial distance from the glass contact surface.

To practice the method of the present invention, the rough castings are made by pouring cast-iron into a composite mold which has dissimilar metal insert blanks fixably positioned therein. The dissimilar metal insert blanks become embedded in the cast-iron matrix to form the rough dissimilar metal inserts of the rough casting. The composite mold has regions which are formed of sand mix and regions which are formed by one or more metal chills, preferably of cast iron. These metal chills are embedded in the sand mix, and have metal-contacting surfaces which, in part, define the shape of the resulting rough castings. The sand mix is composed of sand and other ingredients to make the sand mix formable. The sand mix corresponds to the refractory material referred to in the '259 patent.

To fabricate the composite mold, a pattern and a flask are employed to provide a form which has one or more chills placed therein. When the sand mix is pressed into the chill-containing form, the sand mix engages the chills and, in combination with the chills, conforms to the form. The sand mix, with the chills embedded therein, maintains the shape of the form when withdrawn from the form, providing a composite mold having a composite mold cavity surface which defines the shape of the rough casting. The portion of the composite mold cavity surface that is formed by the metal-contacting surfaces of the chills in combination with the exposed surfaces of the one or more rough dissimilar metal inserts after embedding the dissimilar metal insert blanks in the cast iron defines a cavity surface of the rough casting. The cavity surface of the rough casting is subsequently machined to form the glass contact surface of the bottle mold.

The chills, which are preferably cast iron, have superior thermal conductivity and/or heat capacity than the sand mix, and serve to refine the grain size of the cast iron of the rough casting in the regions which are at and near the glass contact surface of the bottle mold. The refined grain structure provides a prolonged life of the resulting bottle mold. For cast iron chills, it is preferred to have a thickness normal to their metal-contacting surface of at least about 1¼ inches (32 mm). It is further preferred that the chills be provided with insert imprints which are slidably engaged by the dissimilar metal insert blanks in the composite mold and which serve to maintain the dissimilar metal insert blanks in position as the cast iron is poured into the composite mold.

After the rough casting is removed from the composite mold, it is machined to provide a cast-iron bottle mold. The cavity surface of the rough casting is machined to an appropriate contour to form the glass contact surface of the bottle mold. The chills employed in the method of the present invention increase the heat extraction in the region of the rough casting near the chills. This rapid extraction of heat results in a substantial grain size refinement of the cast-iron at and near the chill, which extends for a depth sufficient to remain present after the machining needed to form the glass contact surface is performed. This fine grain structure is beneficial in extending the life of the resulting bottle mold.

Furthermore, when the chills employed in practicing the method of the present invention are provided with insert imprints into which the dissimilar metal insert blanks are set before the cast iron is poured to form the rough casting, these insert imprints greatly enhance flexibility in the size of the dissimilar metal inserts that can be incorporated into the casting. The insert imprints are preferably configured to slidably engage the dissimilar metal insert blanks, to assure that the dissimilar metal insert blanks maintain good thermal contact with the chills. This aids in the extraction of heat from the dissimilar metal insert blanks, allowing greater flexibility in their size and the size of the resulting dissimilar metal inserts. This allows greater freedom in the size of the finished dissimilar metal inserts in the mold, thereby allowing better optimization of their size to assure maximum benefit. The insert imprints in the chills also create a benefit in that they reduce the restrictions on the gating and risering configuration that can be used in the composite mold, since they stabilize the dissimilar metal insert blanks while the molten cast iron is poured.

It is also preferred to employ a gating and risering system which employs a sprue that supplies metal to a riser, which in turn supplies metal to fill the casting. It is further preferred for the rough castings to be poured in pairs to form two halves of a glass bottle mold, in which case the riser resides therebetween. For such a risering system, the pouring temperature of the molten cast iron is preferably between about 2600° F. (1425° C.) and 2675° F. (1470° C.), and more preferably is about 2625° F. (1440° C.).

To assure that the rough dissimilar metal inserts are fixably engaged in the resulting rough casting, it is preferred that the dissimilar metal insert blanks have protrusions thereon. The details of the configuration of the protrusions is dictated by the functions they are to perform in securing the dissimilar metal insert blanks in the cast iron. The securing of the rough dissimilar metal inserts can be either mechanical or metallurgical in nature, or a combination of both.

When a metallurgical bond is sought between the dissimilar metal insert and the cast iron, it is preferred that a series of ridges be provided on at least one of the surfaces of the dissimilar metal insert blank in the region which becomes embedded in the casting. Such a series of protrusions promotes local melting in the region of the peaks of the ridges, aiding in the metallurgical fusion of the dissimilar metal insert to the cast iron in which the dissimilar metal insert is embedded. To enhance mechanical interlocking of the dissimilar metal inserts in the cast iron, a series of substantially radially extending protrusions which radiate into the cast-iron mold wall has been found effective in providing such mechanical interlocking. Employing a combination of both of the above protrusions has been found particularly effective in assuring both mechanical interlocking and metallurgical bonding between the rough dissimilar metal inserts and the cast-iron of the rough casting in which the rough dissimilar metal inserts are embedded. Such securing assures that the rough casting can be readily machined as a unit and that the resulting bottle mold maintains integrity between the dissimilar metal inserts and the remainder of the bottle mold during service.

DETAILED DESCRIPTION OF THE INVENTION

Figure 1:
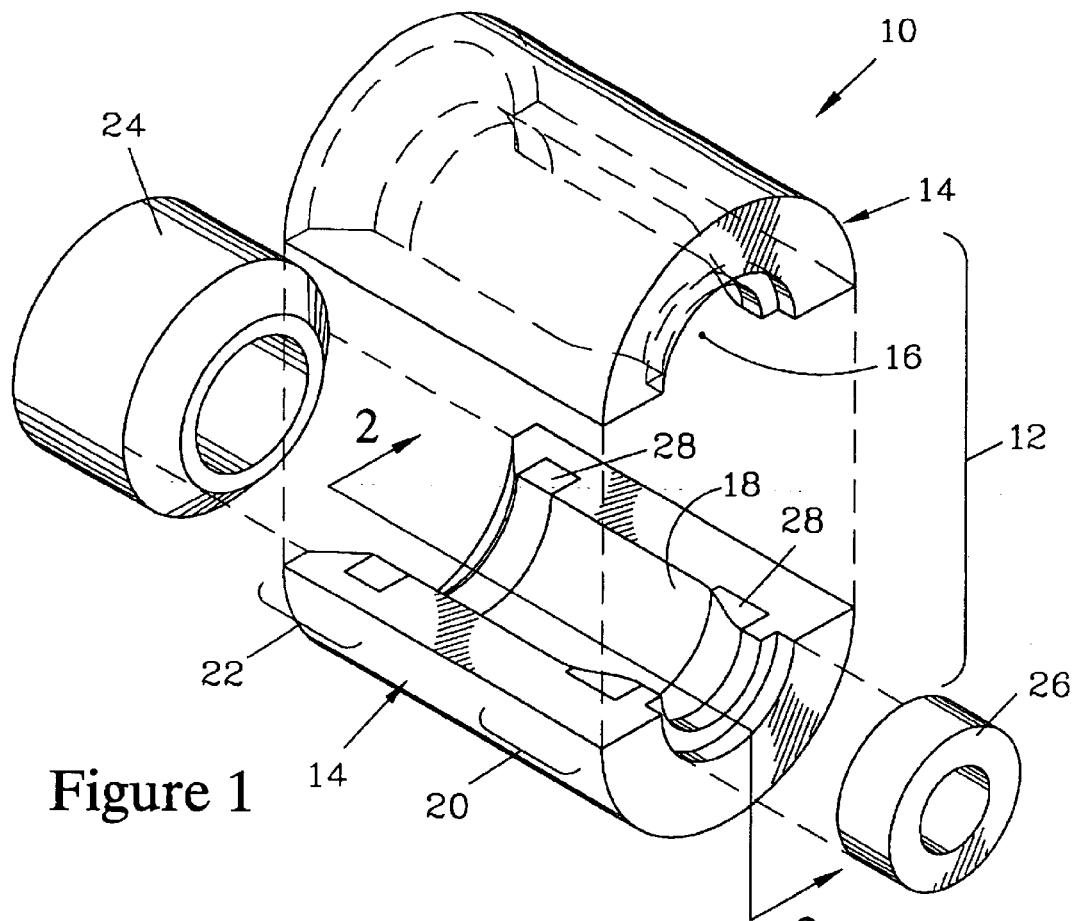
FIG. 1 is an exploded isometric view of a finished cast-iron blank bottle mold illustrating one embodiment of the present invention. The blank bottle mold has two mold body sections, each having dissimilar metal inserts embedded in both a neck region and a baffle region. The blank bottle mold has been machined from a rough casting to form a glass contact surface which defines a bottle cavity, as well as to shape the mold body sections to engage a neck ring and a baffle.

FIG. 1 is an exploded isometric view of a metal blank bottle mold 10 which forms one embodiment of the present invention. The bottle mold 10 has a split mold body 12 having two mating body sections 14, each having a portion of a bottle cavity 16 therein. The bottle cavity 16 is bound by a glass contact surface 18, which passes through a neck region 20 and a baffle region 22 of the bottle mold 10. When a "gob" of glass (not shown) is blown in the bottle mold 10, a baffle 24 and a neck ring 26 are employed to close the bottle cavity 16.

The body sections 14 of the bottle mold 10 are fabricated from cast iron which is well suited to withstand the thermal stress and abrasive action of the "gob" of hot glass as it is blown to form a crude glass shape which conforms to the bottle cavity 16. However, in the neck region 20 and in the baffle region 22, dissimilar metal inserts 28 that are fabricated from a nickel alloy are embedded in the cast iron to provide greater resistance to the action of the glass as the crude glass shape is blown in the bottle cavity 16. One preferred nickel alloy for the inserts 28 has a composition consisting essentially of:

0–0.12% Carbon
2.5–3.0% Silicon
1.5–2.5% Boron
0–0.50% Iron
0–0.50% Chromium
0–0.20% Copper
Remainder Nickel.

A more preferred nickel alloy has a composition consisting essentially of:

0–0.2% Carbon
4–4.5% Silicon
0.2–1.1% Boron
5–5.5% Wrought Iron
6–7% Chromium
Remainder Nickel.

Figure 4:
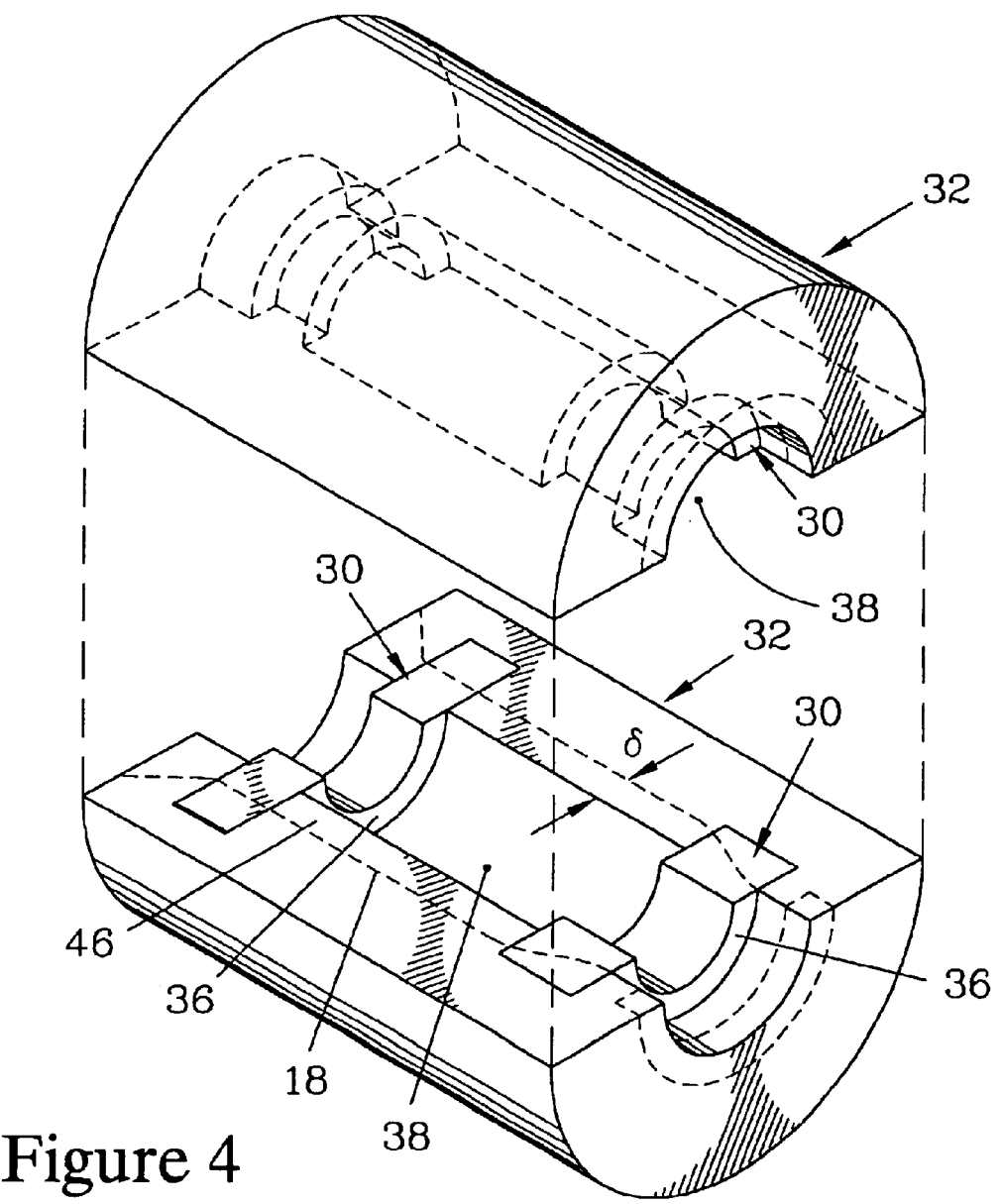
FIG. 4 is an isometric view of a pair of rough castings for forming a bottle mold such as that shown in FIG. 1. The rough castings are illustrated prior to machining to form the mold body sections.

In the present invention, these dissimilar metal inserts 28 are formed by embedding rough dissimilar metal inserts 30 in a pair of rough castings 32 (illustrated in FIG. 4). The rough castings 32 and the rough dissimilar metal inserts 30 embedded therein are subsequently machined to provide the glass contact surface 18 of the blank metal bottle mold 10, with the dissimilar metal inserts 28 forming an integral part of the glass contact surface 18, as best shown in FIG. 2.

Figure 2:
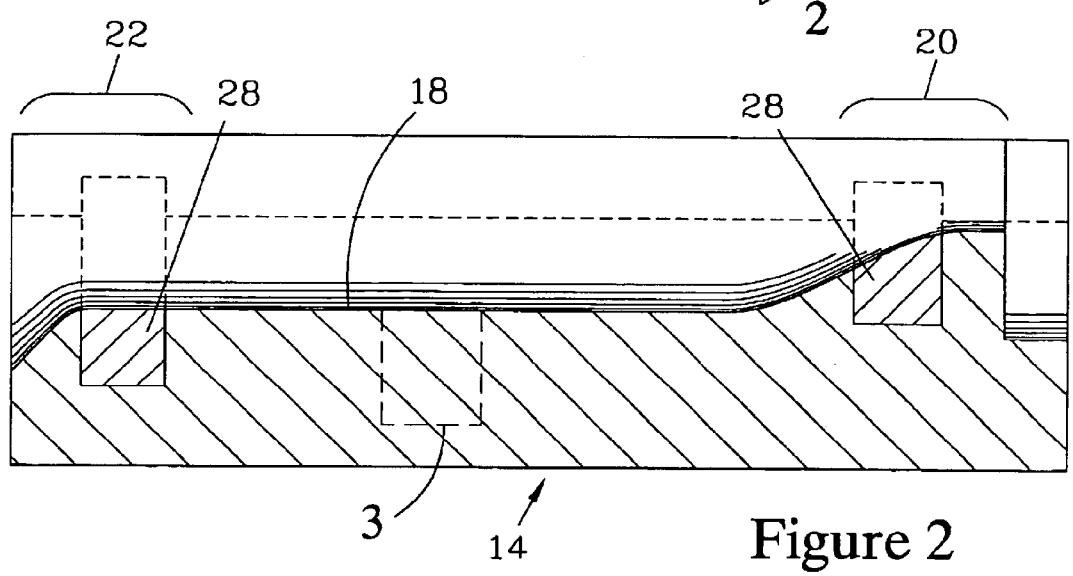
FIG. 2 is a view of section 2—2 of FIG. 1, illustrating the position of the dissimilar metal inserts along the length of one of the mold body sections.

FIG. 2 is a view of the section 2—2 of FIG. 1, and illustrates the contour of the glass contact surface 18, as well as the cross section of the dissimilar metal inserts 28 which are the machined residuals of the rough dissimilar metal inserts 30. In addition to extending the life of the bottle mold 10 by the use of dissimilar metal inserts 28 in the region of greatest degradation from the contact with the hot glass, the bottle mold 10 also benefits from a refinement of the micro-structure of the cast-iron in the vicinity of the glass contact surface 18, as compared to the microstructure that prevails at a substantial distance from the glass contact surface 18. The refined microstructure in the vicinity of the glass contact surface 18 serves to further enhance the life of the bottle mold 10 and results from the method of fabricating the bottle mold 10.

Figure 3:
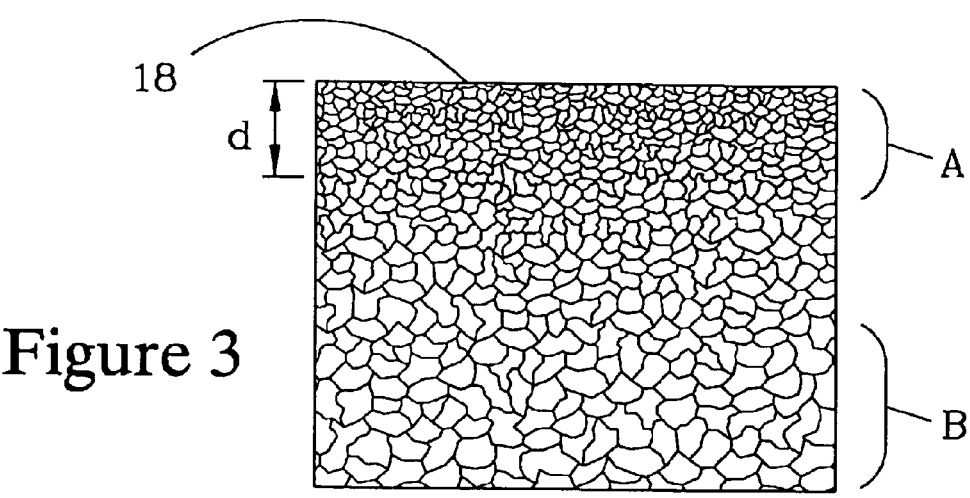
FIG. 3 is a sketch of the region 3 marked in FIG. 2, schematically illustrating the gradation in the grain size of the cast-iron as the distance from the glass contact surface of the blank bottle mold increases.

FIG. 3 is a schematic representation of the region 3 of FIG. 2, illustrating the microstructure of the grain size variation of the cast-iron of the bottle mold 10. As shown, the grain size is substantially larger in regions distant from the glass contacting surface 18 than it is at or near the glass contact surface 18. In fact, there is a region A near the glass contact surface 18 where the grain size is fine compared to a region such as region B which is at a substantial distance from the glass contact surface 18. Preferably, the grain size in region A is about ASTM size 5–8 and extends to a depth d of at least about 3/16 inch (5 mm), while in the region B, which is at a substantial distance from the glass contact surface 18, the grain size is substantially coarser and typically has a grain size of about ASTM size 2–3.

This preferred grain structure, which is in part responsible for extending the life of the cast-iron when exposed to the hot glass, results from the casting technique used to produce the rough casting 32, which is an integral part of the method of the present invention. The method of the present invention also allows greater flexibility in the size of the dissimilar metal inserts 28 which can be incorporated into the bottle mold 10, which overcomes one of the acknowledged limitations of the '259 patent.

Figure 5:
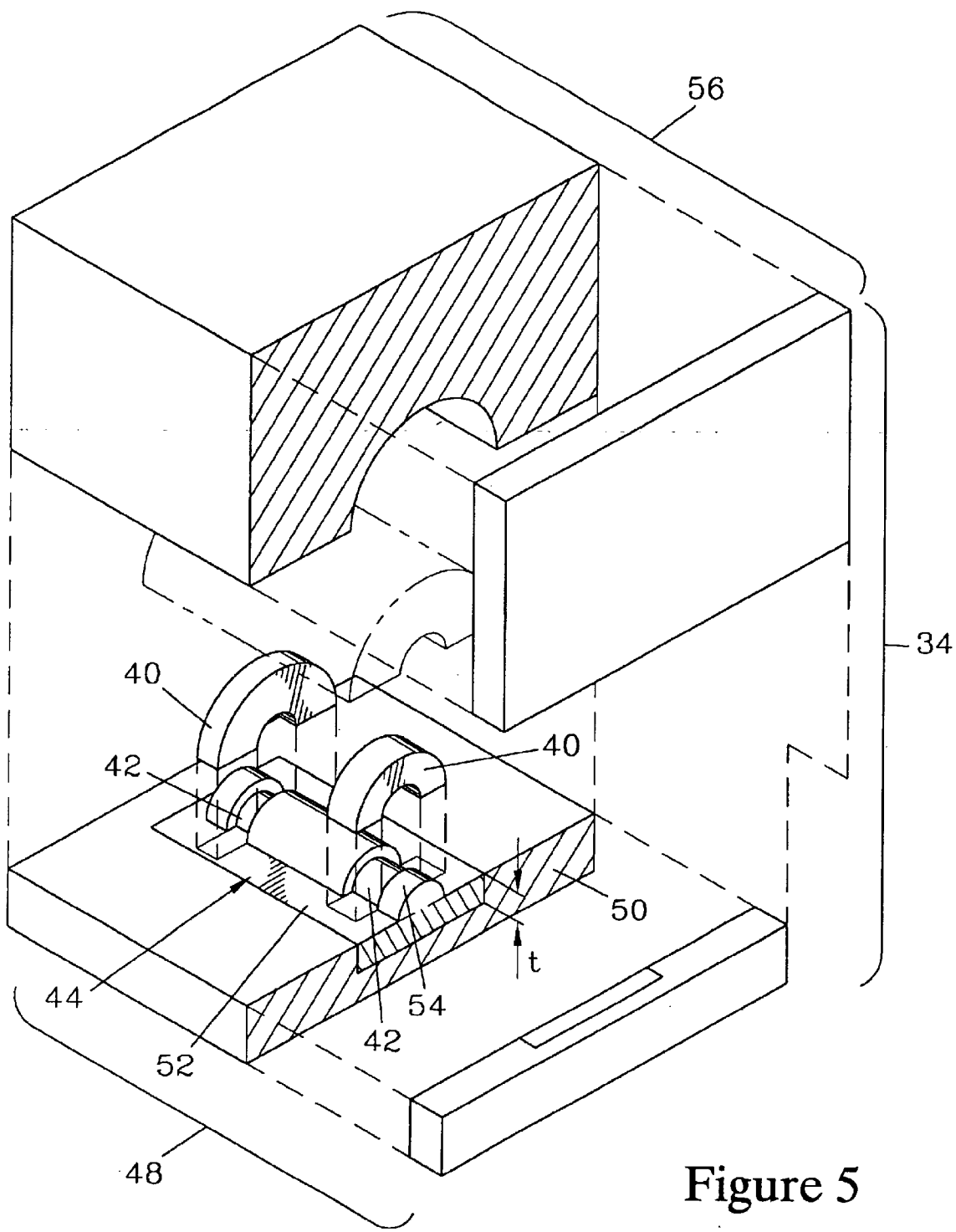
FIG. 5 is an exploded isometric view of a composite mold and associated dissimilar metal insert blanks used to form one of the rough castings illustrated in FIG. 4. The composite mold as depicted does not illustrate a gating and riser system. When cast iron solidifies in the mold, a portion of the dissimilar metal insert blanks become embedded in the cast iron to form rough dissimilar metal inserts. The composite mold has a cope section and a drag section which are assembled to form a mold cavity. A chill forms part of the composite mold cavity which, in combination with the dissimilar metal insert blanks and the remainder of the composite mold, defines the shape of the rough casting. The combination of the dissimilar metal insert blanks and the chill define the contour of a cavity surface of the resulting rough casting, which is subsequently machined to form the glass contact surface of the resulting bottle mold. The chill also has insert imprints for positioning the dissimilar metal insert blanks in the composite mold.

FIG. 4, as mentioned earlier, is an isometric view of the rough castings 32, while FIG. 5 is an exploded isometric view of a composite mold 34 in which each of the rough castings 32 is formed. The method of the present invention will be discussed in reference to these figures to illustrate the interrelationship between the method and the resulting bottle mold 10. FIG. 4 illustrates each of the rough castings 32, having the rough dissimilar metal inserts 30 partially embedded therein. Exposed regions 36 of the rough dissimilar metal inserts 30 reside in a central cavity 38 of the rough casting 32. These exposed regions 36 result from the method for securing dissimilar metal insert blanks 40 (shown in FIG. 5), which are set in the composite mold 34 and are embedded into the cast-iron to form the rough dissimilar metal inserts 30. The dissimilar metal insert blanks 40 are engaged in insert imprints 42 provided in a chill 44, which exclude cast-iron from contacting the exposed regions 36. When the rough casting 32 is subsequently machined to form the glass contacting surface 18 of the bottle mold 10 shown in FIG. 1, the exposed regions 36 are removed, as is an inner layer 46 of the central cavity 38.

Having the chill 44 provided with insert imprints 42 into which the dissimilar metal insert blanks 40 slidably engage provides a highly conductive thermal path between the dissimilar metal insert blanks 30 and the chill 44 to enhance the dissipation of the heat from the molten cast iron, thereby reducing problems of melting and distortion of the dissimilar metal insert blanks 40 during the filling of the composite mold 34 with molten cast iron.

Referring to FIG. 5, the chill 44 of the composite mold 34 is embedded in a drag section 48 of the composite mold 34. The remainder of the drag section 48 is fabricated from green sand 50. For purposes of this example, a green sand has been chosen which is a mixture of sand, clay, and a lubricant such as water so as to form a moldable material; other material could be substituted for the green sand, such as baked sand. The chill 44 has a chill extension 52 which is embedded in the green sand 50, leaving a portion of the chill 44 extending therefrom to provide an exposed chill surface 54. In combination with the exposed regions 36 of the rough dissimilar metal inserts 30, the exposed chill surface 54 defines the central cavity 38 of the rough casting 32. The chill 44 is preferably formed of grey iron which has a relatively high thermal conductivity and heat capacity compared to the green sand 50. To assure that the chill 44 has sufficient thermal mass, it is preferred for the chill 44 to have a minimum thickness t of at least about 1¼ inches (30 mm). It is further preferred for the exposed chill surface 54 of the chill 44 to be configured so as to form the central cavity 38 undersized such that up to about 3/16 inch (5 mm) stock is machined away to form the bottle cavity 16 illustrated in FIG. 1.

When the central cavity 38 is machined, the exposed regions 36 of the rough dissimilar metal inserts 30 are removed by machining and, thereafter, the central cavity 38 is machined to form the bottle cavity 16. The maximum depth of cut δ in the central cavity must be maintained sufficiently small that a sufficient depth of fine grained cast-iron remains to maintain enhanced life of the bottle mold 10. When a chill of thickness t of at least about 1¼ inches (30 mm) is employed, it has been found that a depth of cut δ as large as about 3/16 inch (5 mm) is practical.

A cope section 56 is provided, which mates with the drag section 48 to complete the composite mold 34. For this embodiment, the cope section 56 is made of green sand and may be provided with additional chills if it is advantageous to modify the grain structure in other regions of the rough casting 32.

Figure 6:
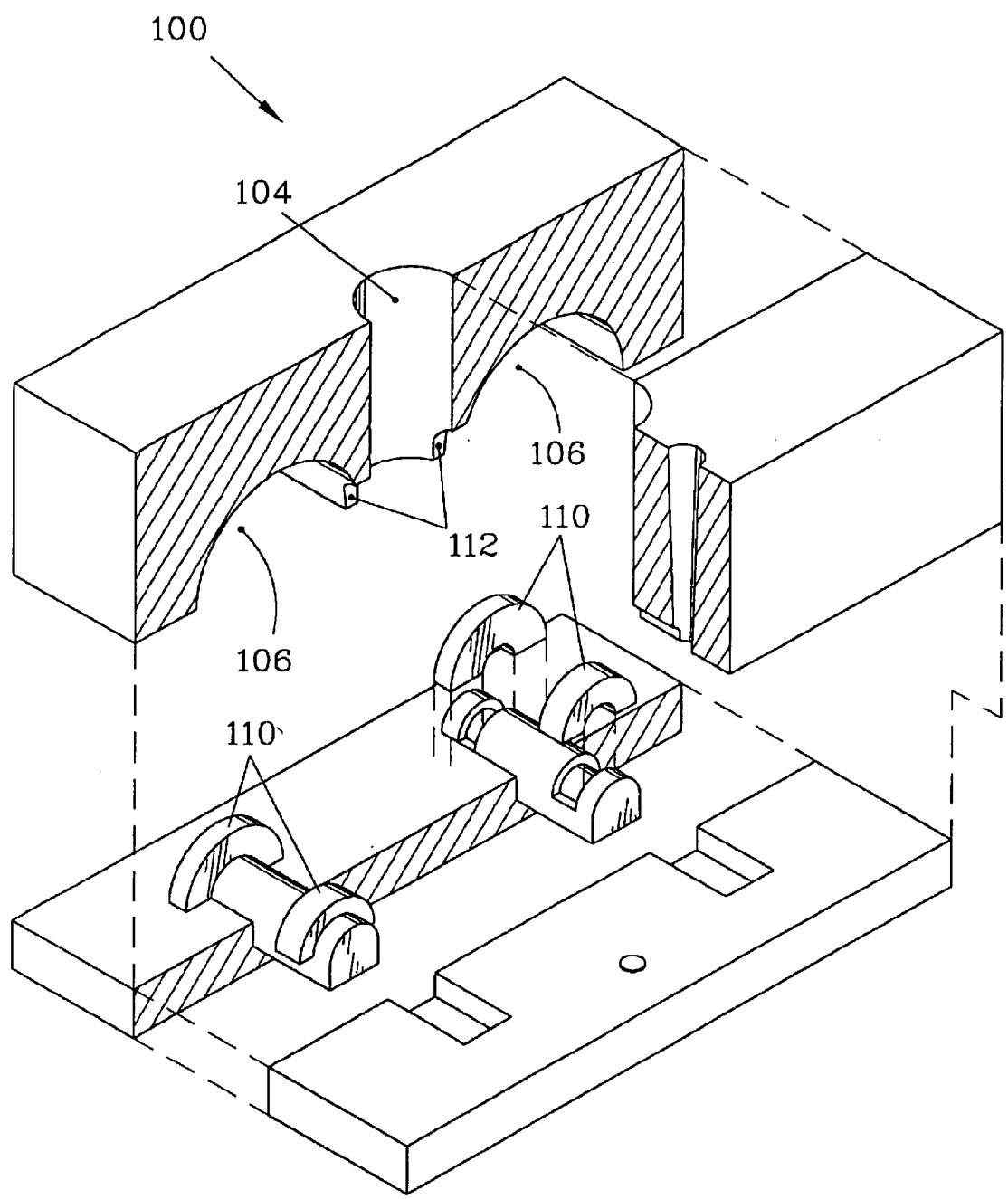
FIG. 6 is an isometric view of a composite mold which illustrates a preferred gating and riser configuration for fabricating a pair of rough castings in a single composite mold. The composite mold has a pair of mold cavities, each having features similar to those of the single composite mold illustrated in FIG. 5. In the gating and riser system shown, a sprue leads to a runner leading to a central riser cavity, and a pair of necks from the riser cavity connect to the mold cavities. The riser cavity with its necks is positioned to introduce the molten cast iron into the mold cavities at a location roughly equidistant from the dissimilar metal insert blanks.
Figure 7:
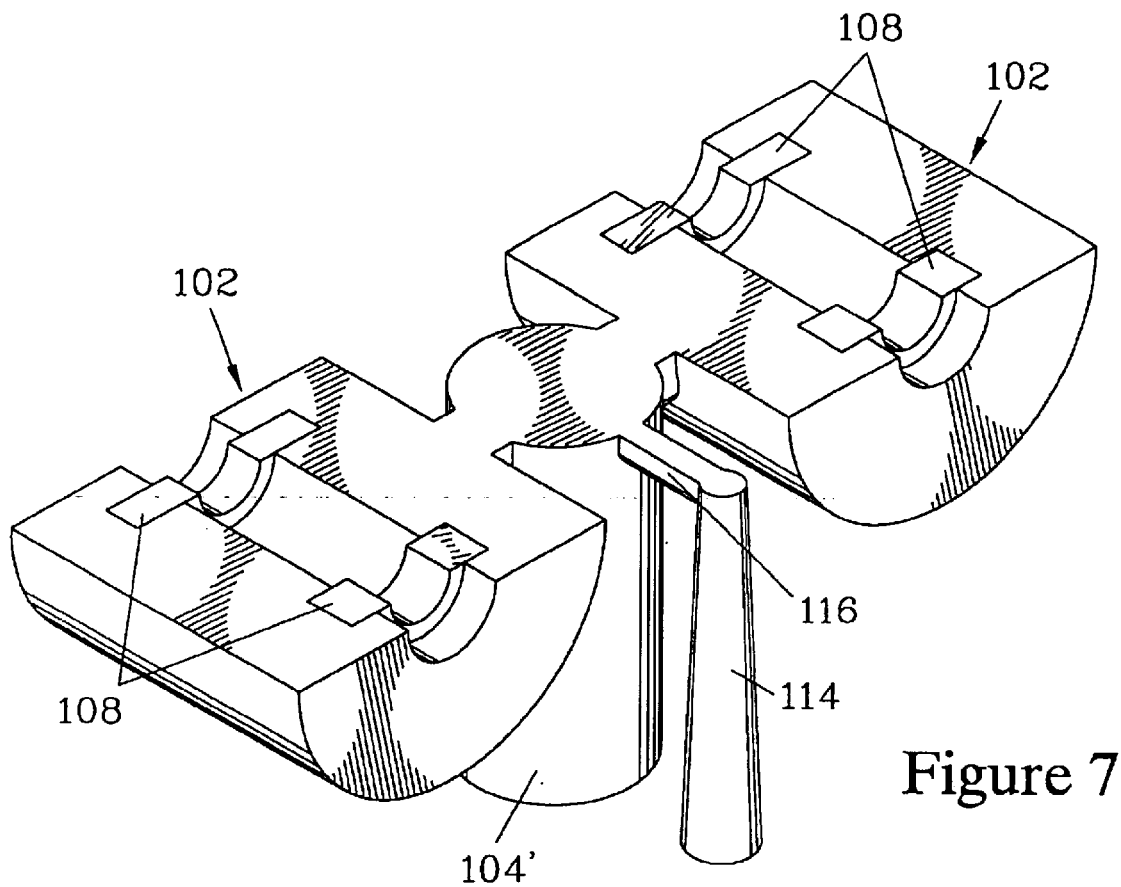
FIG. 7 is an isometric view of a pair of rough castings formed by introducing molten cast iron into the composite mold shown in FIG. 6, as well as gates and risers employed to fill and feed the rough castings. The resultant casting has a pair of rough castings, which can be machined to form mold body sections of a bottle mold.

FIGS. 6 is an exploded isometric view of a composite mold 100 which is designed for casting a pair of rough castings 102 (shown in FIG. 7) suitable for machining to form a metal bottle mold similar to the bottle mold 10 shown in FIG. 1. FIG. 7 illustrates the casting which results from filling the composite mold 100 with molten metal. The composite mold 100 has a central riser cavity 104 which, when filled with molten metal, feeds a pair of composite mold cavities 106. The central riser cavity 104 is centrally located between the composite mold cavities 106. In this embodiment, the resulting rough castings 102 each have a pair of rough dissimilar metal inserts 108, formed by embedding a pair of dissimilar metal insert blanks 110 therein, and a riser 104' is symmetrically disposed between the rough dissimilar metal inserts 108. Riser necks 112 allow for flow of metal to the composite mold cavities 106. The riser in turn is filled by a sprue 114 via a runner 116.

Figure 8:
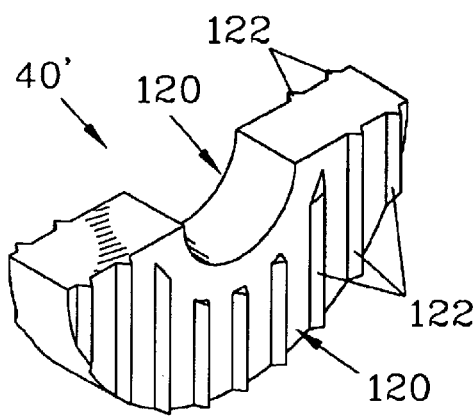
FIG. 8 is an isometric view of a preferred dissimilar metal insert blank for use in forming the bottle molds of the present invention to improve metallurgical bonding of the resulting dissimilar metal insert with the molten cast iron. The dissimilar metal insert blank has a pair of spaced-apart surfaces which are provided with a series of ridges which, when surrounded by molten cast iron, are at least partially melted, assuring a metallurgical bond between the cast iron and the resulting dissimilar metal insert.

FIG. 8 is an isometric view of a baffle region dissimilar metal insert blank 40' which is particularly well suited for incorporation into the rough casting 32 to form the rough dissimilar metal insert 30 shown in FIG. 4. The baffle region dissimilar metal insert blank 40' has side surfaces 120 that have protrusions thereon, which for this embodiment are a series of ridges 122. The ridges 122 provide a region of the baffle region dissimilar metal insert blank 40' having a small volume and large contact surface, to promote localized melting of the baffle region dissimilar metal insert blank 40'. Such localized melting assures a metallurgical bond between the baffle region dissimilar metal insert blank 40' and the cast iron of the rough casting 32. In the baffle region dissimilar metal insert blank 40', the ridges 122 are terminated where the baffle region dissimilar metal insert blank 40' slidably engages one of the insert imprints 42 in the chill 44. It should be pointed out that the dissimilar metal insert blank 40 which forms the dissimilar metal insert 28 in the neck region 20 could also be provided with ridges to promote metallurgical bonding.

Figure 9:
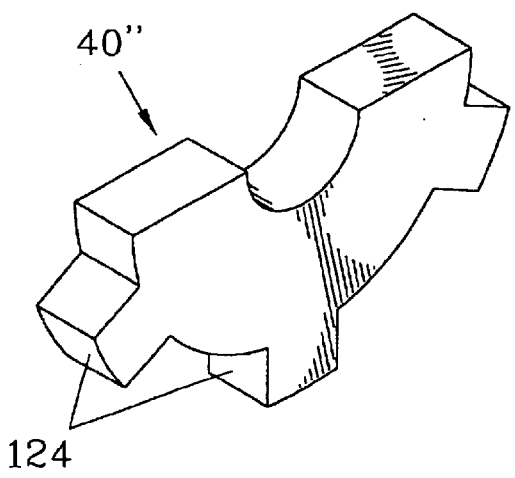
FIG. 9 is an isometric view of another preferred dissimilar metal insert blank for use in forming the bottle molds of the present invention, which provides mechanical interlocking of the dissimilar metal insert in the cast iron. The dissimilar metal insert blank has a series of radially-extending protrusions which project into the cast iron of the rough casting to mechanically hold the resulting dissimilar metal insert in the cast iron matrix.

FIG. 9 is an isometric view of a neck region dissimilar metal insert blank 40" which is also well suited for incorporation into the rough casting 32 shown in FIG. 4. The neck region dissimilar metal insert blank 40" is formed with radially-extending protrusions 124. The radially-extending protrusions 124 are surrounded by the cast iron of the rough casting 32 when the neck region dissimilar metal insert blank 40" is embedded therein, and extend into the cast iron to provide mechanical interlocking between the rough dissimilar metal insert 30 formed by embedding the neck region dissimilar metal insert blank 40" and the cast iron matrix of the rough casting 32. Such radially-extending protrusions 124 could also be provided on the dissimilar metal insert blank 40 which forms the dissimilar metal insert 28 in the baffle region 22, to promote mechanical interlocking.

While the novel features of the present invention have been described in terms of particular embodiments and preferred applications, it should be appreciated by one skilled in the art that substitution of materials and modification of details obviously can be made without departing from the spirit of the invention.

We claim is:

1. An improved method of fabricating a cast-iron bottle mold employing the steps of:
   providing a composite mold having a composite mold cavity contoured to form a rough casting for a bottle mold when filled with molten metal,
   providing a gating system for introduction of cast iron into the composite mold cavity,
   providing a risering system for supplying molten metal to the composite mold cavity as the molten metal solidifies,
   placing at least one dissimilar metal insert blank in at least one region of the composite mold cavity which corresponds to a region of rapid degradation in the resulting bottle mold,
   filling the composite mold with molten cast iron to form a rough casting, and machining the rough casting to form a metal bottle mold, the improvement comprising the steps of:

providing a chill positioned in the composite mold and configured to form a mating surface of a central cavity of the resulting rough casting; and providing an insert imprint in said chill for each of the at least one dissimilar metal insert blanks, each of said insert imprints slidably engaging and fixably holding the corresponding at least one dissimilar metal insert blank.

2. The method of claim 1 wherein the at least one dissimilar metal insert blanks are formed a nickel base alloy.

3. The method of claim 2 wherein the gating system has a riser neck positioned to introduce the molten metal from a central riser at a location approximately midway along the cavity length, the riser communicating with the cavity via the riser neck.

4. The method of claim 3 wherein the riser system has a single riser positioned at the end of the ingate opposite the central cavity.

5. The method of claim 2 further comprising the step of:
providing protrusions on the dissimilar metal inserts.

6. The method of claim 5 wherein said protrusions are serrations.

7. The method of claim 5 wherein said protrusions are radial projections.

\* \* \* \* \*